2 Sheets—Sheet 1.
J. HEBERLING.
Running-Stitch Sewing-Machine.
No. 204,604. Patented June 4, 1878.
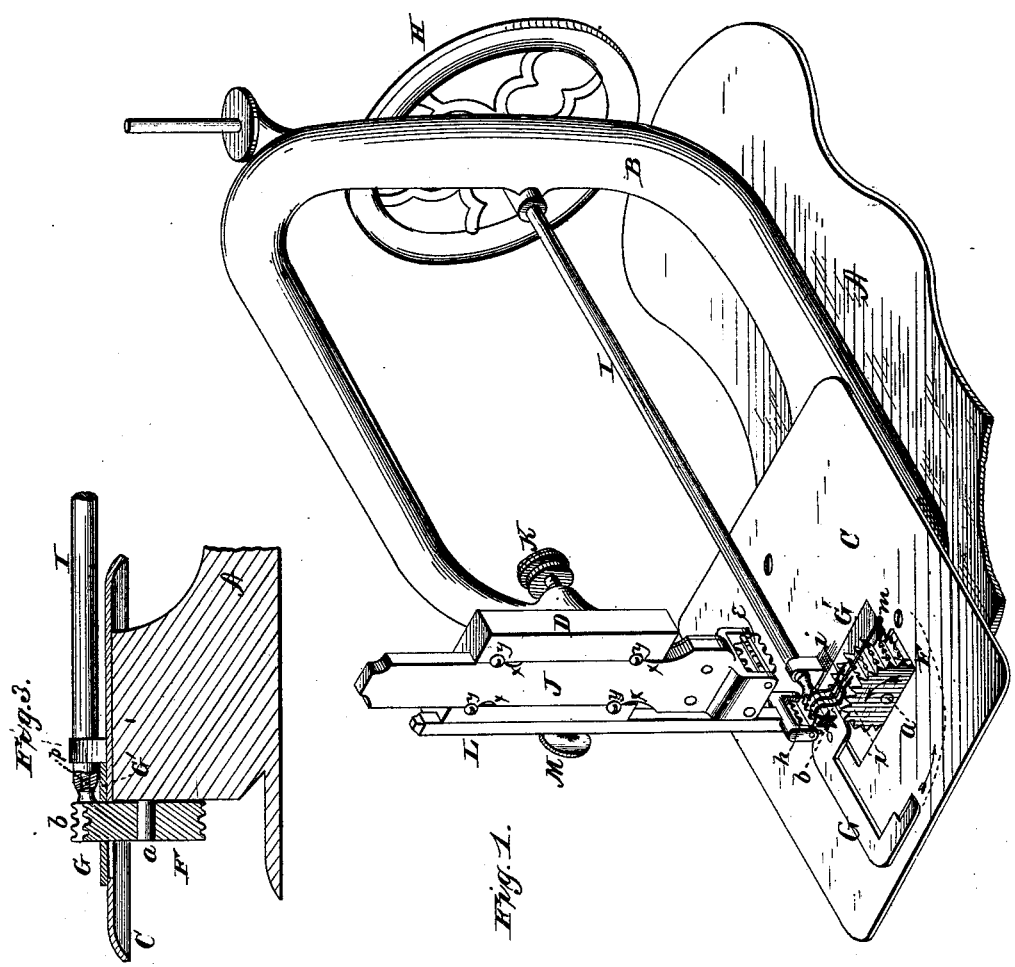
WITNESSES
Franck L. Ourand
J. J. McCarthy
INVENTOR
John Heberling
By
Alexander Mason
Attorneys 2 Sheets—Sheet 2.
J. HEBERLING.
Running-Stitch Sewing-Machine.
No. 204,604. Patented June 4, 1878.
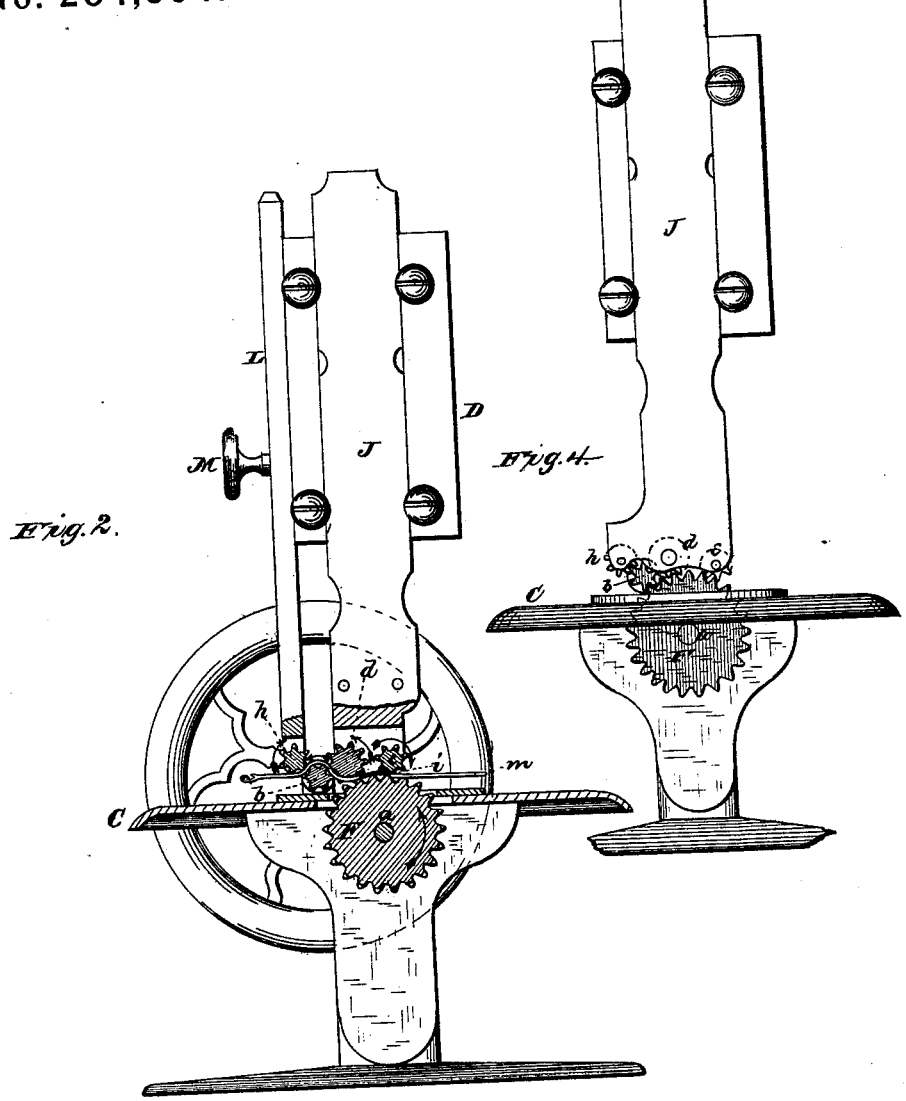
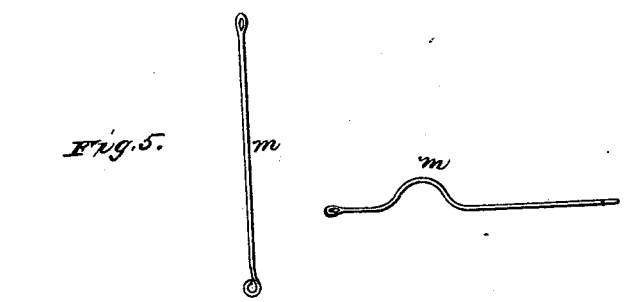
WITNESSES
INVENTOR
John Heberling
By
Attorneys